J. J. ENSLEY.
Making Wood Gas.
No. 2,628.
Reissued May 28, 1867.
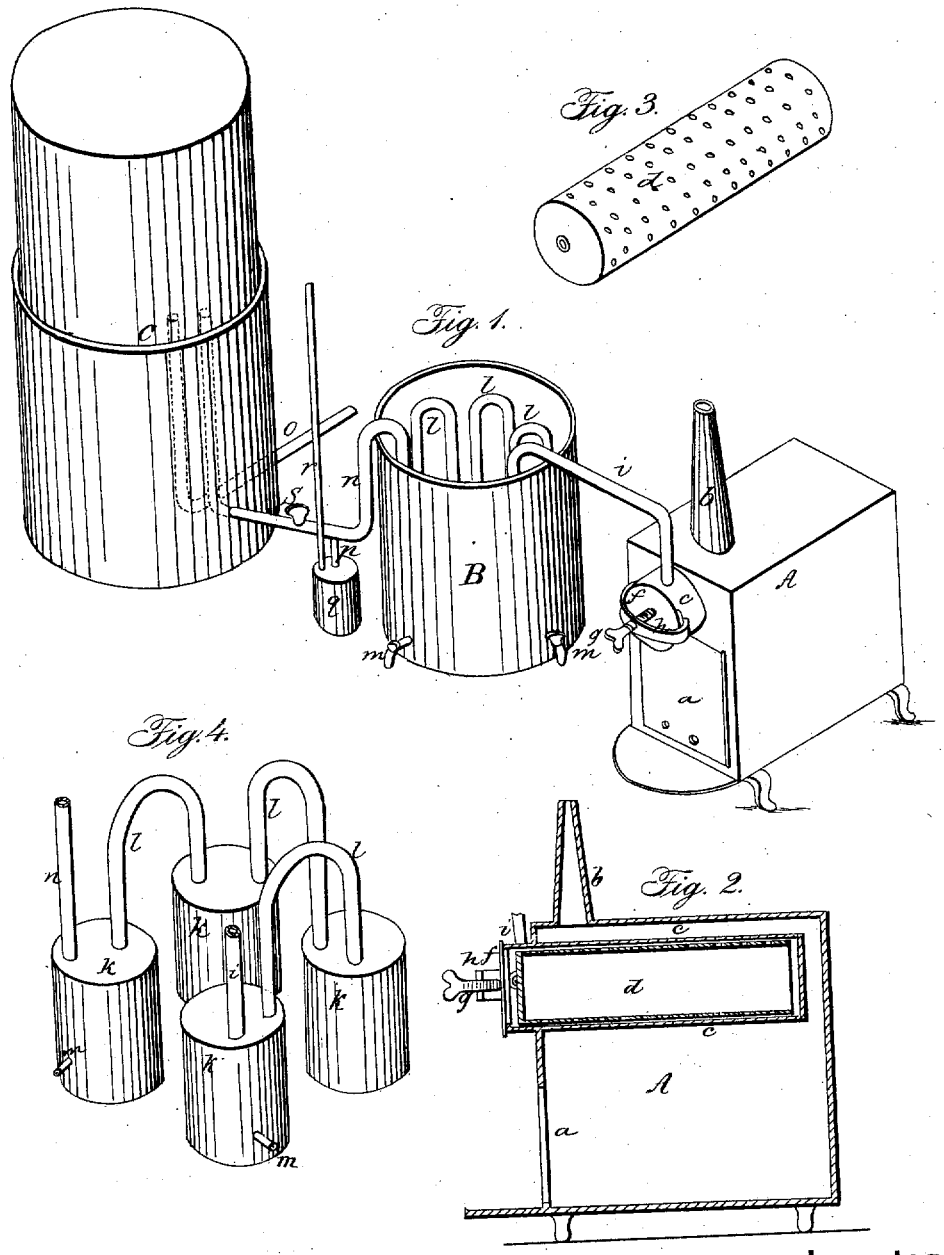
Inventor:
J. J. Ensley
By J. Fraser Jr.
Atty
Witnesses:
R. P. Osgood
J. A. Davis
AM. PHOTO-LITHO. CO. N.Y. (OSBORNE'S PROCESS.)

UNITED STATES PATENT OFFICE.

THOMAS D. LEDYARD, OF TORONTO, CANADA, ASSIGNEE, BY MESNE ASSIGNMENTS, OF J. J. ENSLEY.

IMPROVEMENT IN GENERATING GAS AND OBTAINING OTHER USEFUL PRODUCTS FROM ANIMAL AND VEGETABLE MATERIALS.

Specification forming part of Letters Patent No. 57,491, dated August 28, 1866; reissue No. 2,628, dated May 28, 1867.

*To all whom it may concern:*

Be it known that J. J. ENSLEY has invented certain new and useful Improvements in the Manufacture of Illuminating-Gas from Animal and Vegetable Substances; and I, THOMAS D. LEDYARD, of Toronto, in the Province of Canada, do hereby declare that the following is a full and exact description thereof, reference being had to the accompanying drawings, making part of this specification—

Figure 1 being a view in perspective of the apparatus used in the manufacture of the improved gas; Fig. 2, a longitudinal vertical section of the retort with its furnace or fire-chamber; Fig. 3, a view in perspective of the inner charging-cylinder of the retort; Fig. 4, a view in perspective of the purifying or vapor-condensing vessels or chambers.

Like letters designate corresponding parts in all of the figures.

The leading feature of this invention is the production of a compound gas by the mixture, in proper proportions, of gas made from wood or other vegetable matter, with gas made from bones or other animal matter, the residuum of the processes of making the gas—such as charcoal and bone-black—being preserved and utilized.

The invention also includes an improved apparatus for the production of the compound gas and other utilized substances.

The apparatus as represented in the drawings includes, first, the retort and its fixtures—namely, a fire-chamber or furnace, *a*, and smoke-pipe *b*—of ordinary construction, and the retort itself, composed of an outer cylinder or chamber, *c*, close, except at its outer end, and an inner cylinder or vessel, *d*, open at its inner end and perforated with fine holes around its periphery, as shown in Fig. 3. Of this inner retort-cylinder there may be a set of two or more, to be used successively. The cylinder is charged with the vegetable or animal substance or substances from which the gas is to be made, and it is then inserted into the cylinder or chamber *c*, which is then closed at its mouth or open end by a cover, *f*, fitting closely and held in place by a removable cross-bar or nut, *h*, and screw *g*. Thus the retort is closed gas-tight.

From the retort a pipe, *i*, conducts the gas as fast as generated to one of a series of purifying or vapor-condensing vessels or chambers, *k k*, represented separately in Fig. 4, but which are situated in a tank, B, and surrounded by water therein. All of these vessels are successively connected by pipes *l l*, substantially as shown, whereby the gas is conducted successively from one to another through the whole set. In these vessels the watery vapors are condensed and drawn off through stop-cocks or spigots *m m*, extending out through the sides of the tank B. From the final vapor-condensing vessel a pipe, *n*, conducts the gas into a gasometer, C, of usual or any suitable construction, and from this it is distributed by a pipe or pipes, *o*, for use. From the lowest portion of the conducting-pipe *n* a short branch pipe, *p*, extends to a close reservoir or vessel, *q*, which is connected by a pipe, *r*, with a suitable pump, by which any water or other liquid which may collect in the pipe *n* may be drawn off when necessary without wasting the gas or admitting the air.

The use of the interior cylinder or vessel, *d*, of the retort enables the charges to be put in and taken out much more quickly, and a cylindrical form is desirable to enable the substances to be turned over frequently and exposed on different sides to the extreme heat. This is the more necessary in the production of the compound gases from different vegetable and animal substances of greatly varying consistency.

The vapor-condensing chambers *k k* are very efficient by exposing large surfaces to the cooling action of the water in the tank.

By this apparatus one can make and purify gas made either from vegetable or animal substances. Gas is first made, say, from vegetable substances alone, and stored in the gasometer, and then gas from animal matter is made and mixed with it in proper proportions. A mixture of gases from vegetable and animal substances is found to be superior for illumination to a simple gas made from either alone, securing thereby proper proportions of hydrogen and carbon. Experiment shows that the gases produced from three parts of vegetable to one part of animal matter furnish about the most suitable proportions, though they may vary without material injury.

Instead of making the vegetable and animal gases successively, they may be made simultaneously by employing two sets of apparatus, though one gasometer may answer for both.

Another object gained in this process is the saving and utilizing of the residuum or products of the distillation, such as bone-black from the animal matter and charcoal, &c., from the vegetable substances.

What I claim as the said invention, and desire to secure by Letters Patent, is—

1. Making a compound gas by the mixture, in proper proportions, of gas made from wood or other vegetable matter with gas made from bones or other animal matter, substantially as and for the purpose herein specified.

2. The combination of the perforated charge cylinder or vessel *d*, open at the inner end, and the horizontal close retort cylinder or chamber *e*, substantially as and for the purpose herein specified.

3. The vapor-condensing vessels or chambers *k k*, connected by the pipes *l l*, and provided with discharge-cocks *m m*, when used in combination with the inclosing water-tank B, substantially as described.

4. The combination and arrangement of the tight vessel or chamber *q* and pipes *p r* with the pipe *n* for the purpose of pumping off the condensed water that gathers therein without admitting air or allowing escape of gas, substantially as set forth.

In witness that the above is a full and exact specification of the aforesaid improvements I have hereunto set my hand this 11th day of April, 1867.

T. D. LEDYARD.

Witnesses:
W. HARRIS,
THOS. SHORTESS.